United States Patent
Tomikawa

(10) Patent No.: US 6,744,465 B1
(45) Date of Patent: Jun. 1, 2004

(54) DIGITAL CAMERA WITH NONVOLATILE MEMORY FOR STORING IMAGE MANAGEMENT DATA

(75) Inventor: Masahiko Tomikawa, Itami (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/533,872

(22) Filed: Mar. 24, 2000

(30) Foreign Application Priority Data

Mar. 26, 1999 (JP) .......................................... 11-084033

(51) Int. Cl.⁷ ........................... H04N 5/76; H04N 5/225
(52) U.S. Cl. .................. 348/231.2; 348/372; 348/231.7
(58) Field of Search ........................ 348/231.99, 231.2, 348/231.3, 372; 707/104.1; 369/53.45

(56) References Cited

U.S. PATENT DOCUMENTS

| | | | |
|---|---|---|---|
| 5,173,892 A | * 12/1992 | Yamada | .................. 369/53.45 |
| 5,303,214 A | * 4/1994 | Kulakowski et al. | ....... 369/30.3 |
| 5,367,672 A | * 11/1994 | Takagi | ............................ 707/3 |
| 5,392,269 A | * 2/1995 | Horie | ......................... 369/53.2 |
| 5,642,458 A | 6/1997 | Fukushima et al. | |
| 5,724,544 A | * 3/1998 | Nishi | .......................... 711/115 |
| 5,917,542 A | * 6/1999 | Moghadam et al. | ... 348/231.99 |
| 6,463,509 B1 | * 10/2002 | Teoman et al. | ............. 711/137 |

FOREIGN PATENT DOCUMENTS

| | | |
|---|---|---|
| EP | 0 666 539 A2 | 8/1995 |
| EP | 0 679 983 A2 | 11/1995 |
| JP | 04010276 A * | 1/1992 ........... G11B/19/02 |

* cited by examiner

Primary Examiner—Ngoc-Yen Vu
Assistant Examiner—Timothy J. Henn
(74) Attorney, Agent, or Firm—Armstrong, Kratz, Quintos, Hanson & Brooks, LLP.

(57) ABSTRACT

The invention provides a digital camera comprising a disk drive device 1, control circuit 2, flash memory 7, flag processing circuit 8 and memory 9. Power can be supplied to the flag processing circuit 8 and the memory 9 at all times. The control circuit 2 reads image management data from a disk, writes the read data to the flash memory 7, and thereafter gives a flag rewrite command to the flag processing circuit 8. The circuit 8 changes a flag in the memory 9 to "1" in response to the command, and changes the flag to "0" when withdrawal of the disk from the drive device 1 is thereafter detected. The control circuit 2 reads and writes the image management data only when the power source of main body of the camera is turned on, with the flag set to "0", whereby the power consumption of the camera can be reduced.

3 Claims, 4 Drawing Sheets

DIGITAL CAMERA WITH NONVOLATILE MEMORY FOR STORING IMAGE MANAGEMENT DATA

FIELD OF THE INVENTION

The present invention relates to digital cameras comprising a disk drive device which is adapted to record on a disk images photographed by an image pickup device such as a CCD (charge-coupled device) and image management data as to the images as digital data, or to reproduce the images and image management data recorded on the disk.

BACKGROUND OF THE INVENTION

Digital cameras are known in recent years which are equipped with a disk drive device capable of recording the images photographed by an image pickup device, such as a CCD, on an erasable optical disk, hard disk or like disk as digital data, or reproducing the images recorded on the disk.

Optical disks have a region for recording the images photographed by a CCD, and a region for recording image management data as shown in a signal recording format of FIG. 4. When the digital camera equipped with a disk drive device, for example, for optical disks is used for taking photographs, image data as to the image photographed by the CCD is converted to digital data and then compressed according to the JPEG (Joint Photographic Coding Experts Group) system or MPEG (Moving Picture Coding Experts Group) system, and the compressed image data obtained is recorded as an image file in the image recording region of the optical disk. Image management data as to the image file is recorded in the image management data recording region. The image management data contains, for example, a file name indicating the name of the image file, and position data indicating the position where the image file is recorded.

With the digital camera of the type described, the image management data recorded on the optical disk is read therefrom and written to a RAM or like memory incorporated in the camera main body when the user turns on the power source of the camera main body with the disk set in the disk drive device, or when the user sets the disk in the drive device with the power source turned on.

When the user thereafter performs a predetermined procedure for reproducing the desired image file among a plurality of image files recorded on the disk, the image file selected by the user is specified with reference to the image management data written to the memory as described above and reproduced from the disk.

Since the memory used in the conventional digital camera described is a volatile memory, the image management data stored in the memory disappears immediately when the power source of the camera main body is switched off to discontinue the supply of power to the memory.

Accordingly, even in the case where the power source of the camera main body which is on is switched off with the disk set in the drive device, and the power supply is thereafter turned on without changing the disk, it is necessary to move the pickup of the drive device to the image management data recording region of the disk to read the image management data again from the disk and write the read data to the memory.

Thus, there is a need to read and write the image management data every time the power source of the cameral main body is turned on whether the disk is replaced or not, so that the conventional digital camera has the problem of necessitating great power consumption.

SUMMARY OF THE INVENTION

An object of the present invention is to provide a digital camera which is reduced in power consumption.

The present invention provides a digital camera comprising an image pickup device and a disk drive device adapted to record on a disk images photographed by the image pickup device and image management data as to the images as digital data, or to reproduce images and image management data recorded on the disk. The digital camera is characterized in that the camera comprises:

memory means comprising a nonvolatile memory for storing the image management data recorded on the disk, information processing means for reading the image management data from the disk as placed in the disk drive device and writing the read image management data to the memory means when a power source of main body of the camera is turned on, means for storing therein a flag having a first value indicating a need to cause the information processing means to read and write the image management data or a second value indicating that there is no need to do so, flag processing means for rewriting the flag in response to an action of a user, and power supply means for holding the flag storing means and the flag processing means in operation at all times.

The information processing means comprises:

means for checking whether the flag stored in the flag storing means has the first value or the second value when the camera body power source is turned on, and data processing means for reading the image management data from the disk as placed in the disk drive device and writing the read image management data to the memory means when the flag has the first value.

With the digital camera of the present invention, the image pickup device, disk drive device, memory means and the information processing means are in operation with power supplied thereto while the power source of the camera main body is on, and are held out of operation with the power supplied discontinued when the power source is off.

On the other hand, the flag processing means is held in operation at all times, always detecting the action or manipulation by the user, if any, whether the camera main body power source is on or off. The flag processing means rewrites the flag in the flag storing means, for example, when the disk is drawn out of the drive device by the user or when the user turns on the power source for the data processing means to write image management data to the memory means as will be described below. Since the flag storing means is held in operation at all times, it is unlikely that the flag in the flag storing means will be lost by turning on the power source of the camera main body.

With the digital camera described above, a plurality of images photographed by the image pickup device are recorded on the image recording region of the disk, and image management data as to these images is stored in the image management data recording region thereof.

Immediately when the user sets in the drive device the disk having the images and image management data recorded thereon as described above and turns on the power source of the camera main body, power is supplied to the image pickup device, disk drive device, memory means and information processing means. The checking means of the information processing means checks whether the flag in the flag storing means has the first value or second value.

When the flag is found to be of the first value by the checking means, the image management data is read from the region recording this data on the disk, and the read image management data is written to the memory means. The camera is then made ready for photographing and image reproduction.

If the flag is found to be of the second value by the checking means, on the other hand, the camera is made ready for photographing and reproduction without the reading and writing of the image management data. Since the memory means comprises a nonvolatile memory, the memory means has stored therein the image management data immediately before the camera main body power source is switched from off-state to on-state previously, and the image management data in the memory means is in match with the image management data recorded on the disk as set in the drive device.

With the digital camera of the present invention, the image management data is read and written when the camera main body power source in off state is turned on only in the case where the flag has the first value, so that the camera is smaller in power consumption than the conventional digital camera wherein the image management data is read and written every time the camera main body power source is turn on.

Stated more specifically, the flag processing means comprises:
  means for detecting withdrawal of the disk from the disk drive device, and
  flag rewrite means for changing the flag value to the second value in response to a flag rewrite command and changing the flag value to the first value when the disk is drawn out of the disk drive device; and the information processing means comprises:
    means for commanding the flag rewrite means to rewrite the flag when the image management data has been read and written by the data processing means.

When the camera main body power source which is off is turned on by the user, with the disk set in the drive device, the flag is checked as to whether the flag has the first value or second value as stated above, and the image management data is read and written in the case where the flag is of the first value. At this time, a flag rewrite command is given to the flag rewrite means to change the flag from the first value to the second value.

The user will turn on the camera main body power source after turning off the power source with the disk set in the drive device, drawing out the currently set disk from the drive device for replacement and setting another disk in the drive device. At this time, the flag is checked for the value. The flag is found to be of the first value if the disk is drawn out while the power source is off. The image management data is therefore read and written, and the camera then becomes ready for photographing and reproduction.

On the other hand, the user will turn off the camera main body power source with the disk set in the drive device and thereafter turn on the power source without replacing the disk. At this time, the flag is checked for the value. The flag is then changed from the first value to the second value as stated above and is thereafter held at the second value. Accordingly, the camera becomes ready for photographing and reproduction without the reading and writing of the image management data.

With the digital camera having the foregoing construction, the image management data is read and written to a memory upon the power source of the camera main body being turned on only in the case where the disk has been replaced with the power source off.

Further stated more specifically, the information processing means comprises first updating means for updating the image management data on the disk in response to an action of the user, and second updating means for updating the image management data written to the memory means upon updating of the image management data on the disk.

For example when the digital camera thus constructed is used for photographing, the image photographed by the image pickup device is recorded on the image recording region of the disk, and the image management data in the region for recording this data is updated. The image management data stored in the memory means is also updated.

Accordingly even in the case where the user turns off the power source of the camera main body after photographing an image and subsequently turns on the power source again without replacing the disk, the image management data stored in the memory means is in match with the image management data recorded on the disk, so that the image management data need not be read or written when the power source is turned on. This results in a further reduction in power consumption.

With the digital camera of the present invention, the image management data is read and written when the power source of the camera main body is turned on only in the case where the flag has the first value. The camera is therefore smaller in power consumption than the conventional digital camera wherein the image management data is read and written every time the power source of the camera main body is turned on.

DETAILED DESCRIPTION OF EMBODIMENT

An embodiment of the invention will be described below in detail with reference to the drawings.

Figure 1:
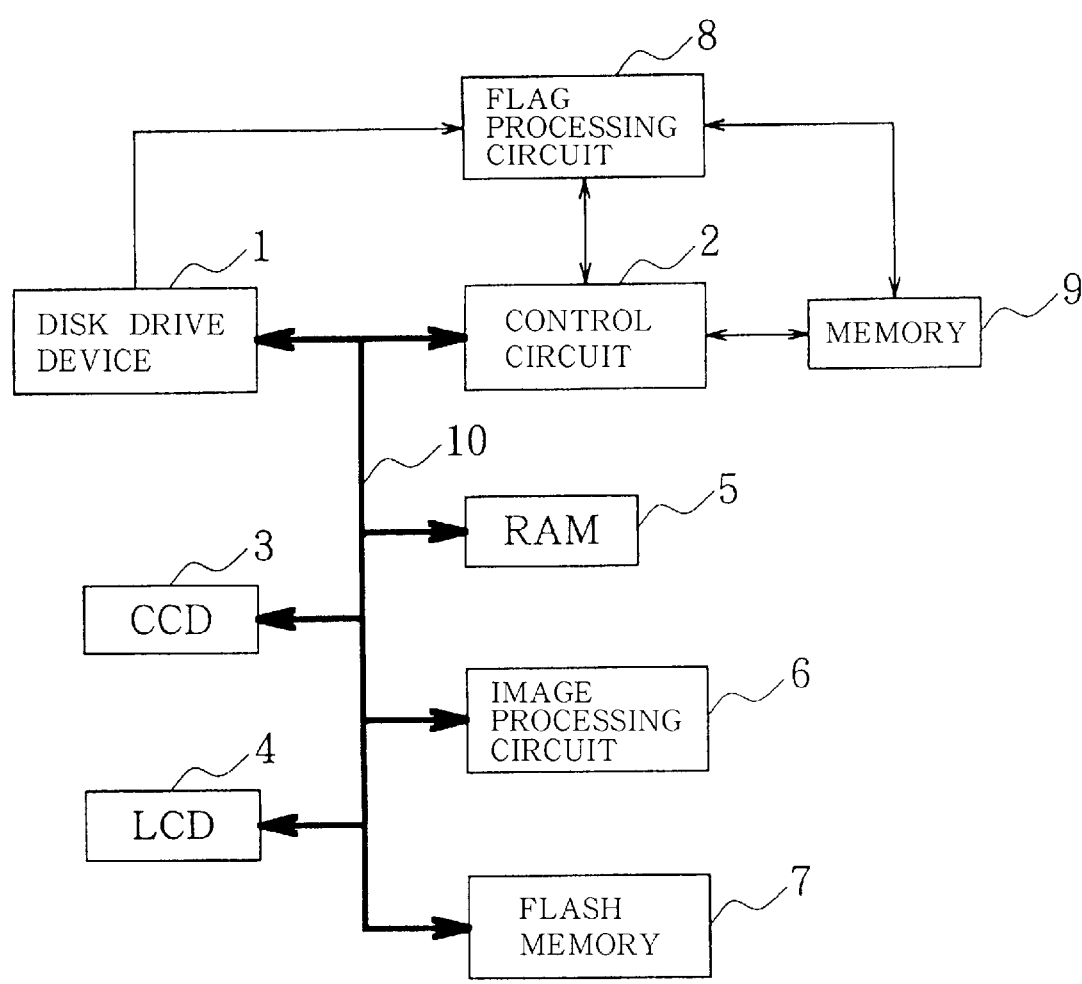
FIG. 1 is a block diagram showing the construction of a digital camera of the invention.

The digital camera of the present invention is adapted to record on erasable optical disks the images, such as still pictures or moving pictures, photographed by a CCD, and comprises a disk drive device 1 for optical disks as shown in FIG. 1.

The disk drive device 1 is connected by a bus 10 to a control circuit 2, which has connected thereto a CCD 3, LCD (liquid-crystal display) 4, RAM 5 and image processing circuit 6 by the bus 10. These components, i.e., drive device 1, control circuit 2, CCD 3, LCD 4, RAM 5 and image processing circuit 6, each perform a predetermined operation with power supplied thereto when the power source of the camera main body is turned on, or cease the operation upon an interruption of power supply when the camera main body power source is turned off.

Figure 4:
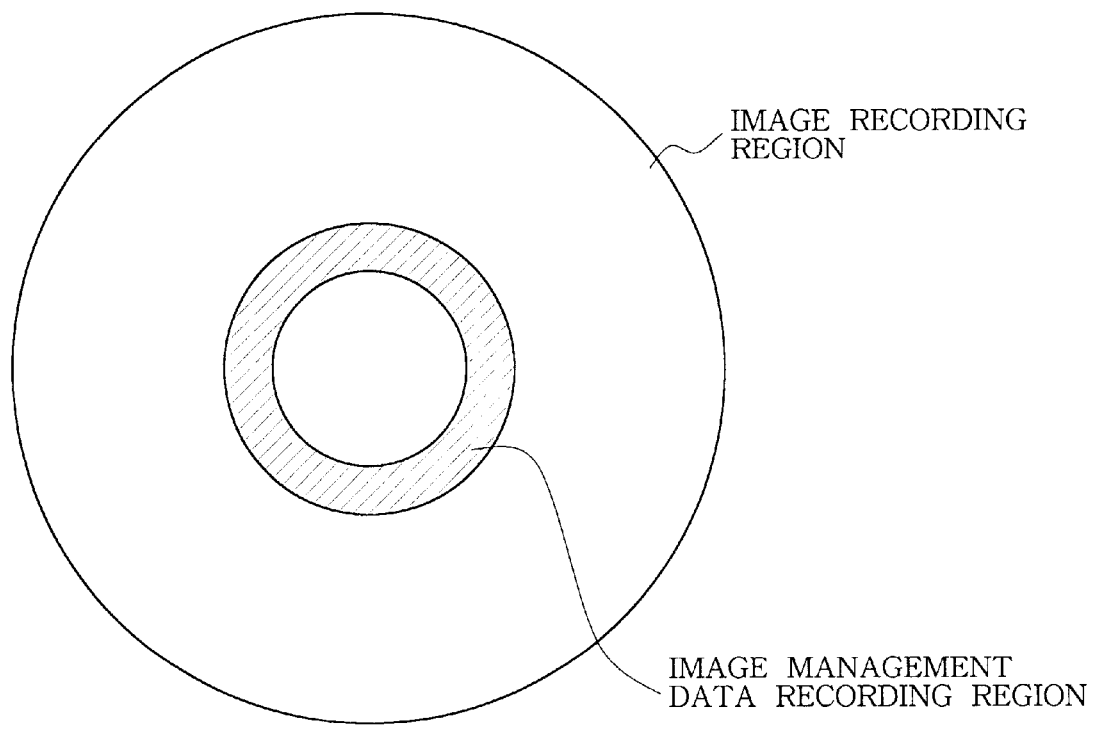
FIG. 4 is a diagram showing a signal recording format of optical disks.

The user depresses a shutter button (not shown) with the camera main body power source on, whereupon the data as to the image photographed by the CCD 3 is fed to the image processing circuit 6 for conversion to digital data, which is compressed according to the JPEG or MPEG system or the like. The compressed image data obtained is recorded as an image file in the image recording region of an optical disk shown in FIG. 4. Image management data indicating the name of the image file and the position of the file is recorded in the image management data recording region of the disk.

Also connected by the bus 10 to the control circuit 2 is a flash memory 7 for writing thereto the image management data recorded on the disk as described above. Other known erasable nonvolatile memory, such as EPROM or EEPROM, is usable in place of the flash memory 7.

Power is supplied to the flash memory 7 when the camera body power source is turned on, or the power supply to the memory 7 is discontinued when the power source is turned off.

A flag processing circuit 8 having a microcomputer incorporated therein is connected to the disk drive device 1, while a memory 9 is connected to the flag processing circuit 8. The flag processing circuit 8 and the memory 9 are connected to the control circuit 2. Power can be supplied to the flag processing circuit 8 and the memory 9 at all times whether the power source of the camera main body is turned on or off.

The memory 9 is provided with a column to which is written a flag having the value "0" indicating a need to read the image management data from the optical disk or the value "1" indicating that this is unnecessary.

The disk drive device 1 has incorporated therein a switch (not shown) which is on when the optical disk is set in the device or off when no disk is set therein.

The microcomputer of the flag processing circuit 8 recognizes the on-state of the switch and feeds a set signal to the control circuit 2. When thereafter given the flag rewrite command to be described below by the control circuit 2, the microcomputer changes the flag in the memory 9 from "0" to "1".

Upon the switch changing from on-state to off-state, the microcomputer of the flag processing circuit 8 detects this change and changes the flag in the memory 9 from "1" to "0".

Figure 2:
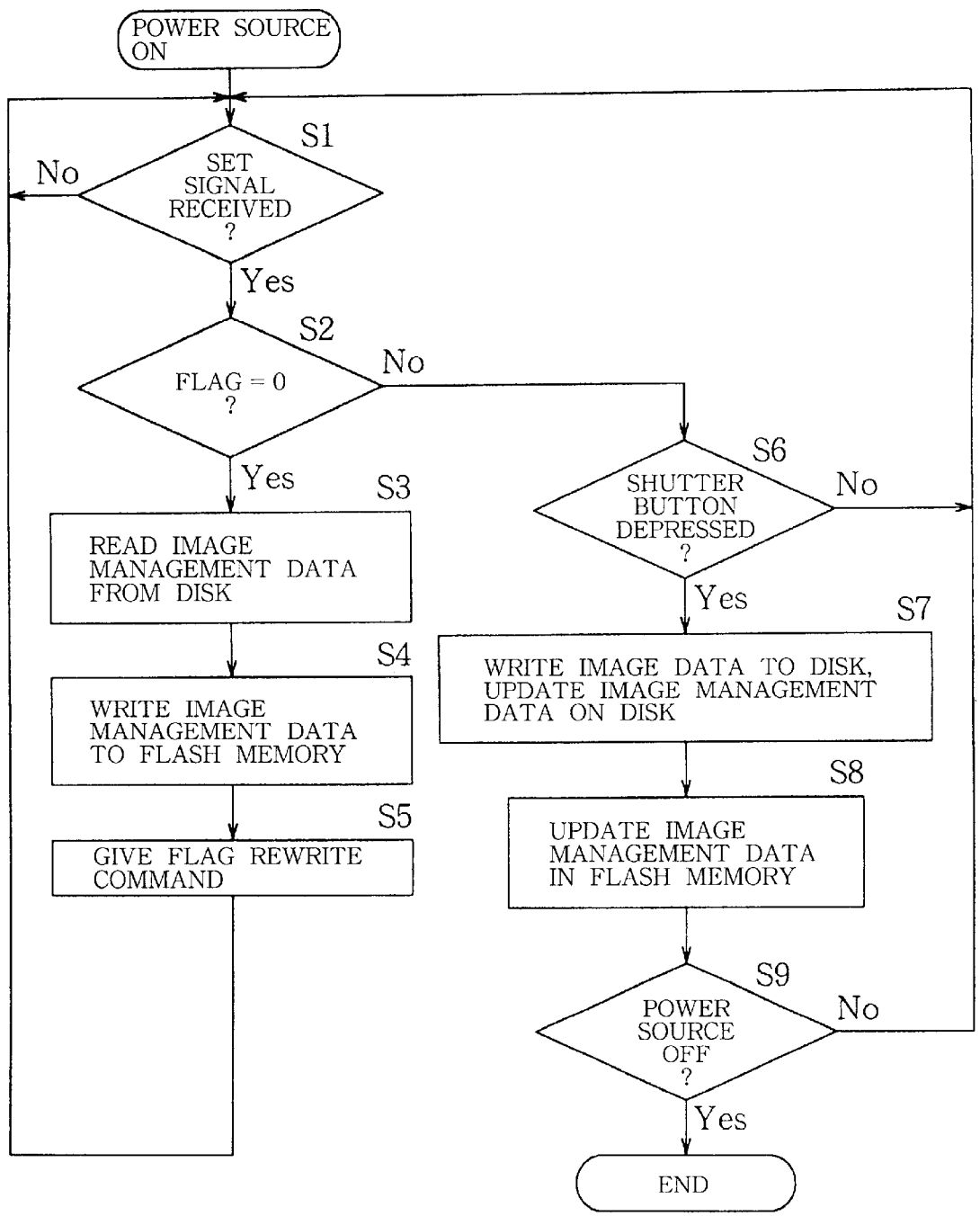
FIG. 2 is a flow chart showing the procedure to be performed by a control circuit of the invention for reading and writing image management data.

FIG. 2 shows the image management data reading and writing procedure to be performed by the control circuit 2 of the invention.

When the power source of the camera main body is turned on, an inquiry is made in step S1 as to whether a set signal has been received from the flag processing circuit 8. If an optical disk is set in the disk drive device 1, the inquiry is answered in the affirmative with the set signal supplied from the circuit 8, followed by step S2, whereas if not disk is set in the drive device 1, the inquiry of step S1 is answered in the negative, followed by step S1 again to repeat the same inquiry.

Step S2 inquires whether the flag written to the memory 9 is "0". If the answer is affirmative, the sequence proceeds to step S3, in which image management data is read from the optical disk, and the read management data is written to the flash memory 7 in step S4. Subsequently in step S5, the control circuit 2 gives a flag rewrite command to the flag processing circuit 8, followed by step S1 again.

When the flag in the memory 9 is found to be "1" and step S2 is answered in the negative, step S6 follows to inquire whether the shutter button has been depressed. If the answer is negative, the sequence returns to step S1.

Upon the user depressing the shutter button for photographing, step S6 is answered in the affirmative, followed by step S7 to write compressed data as to the image taken by the CCD 3 and update the image management data recorded on the disk.

Subsequently, the image management data in the flash memory 7 is updated in step S8, an inquiry is made in step S9 as to whether the power source is off, and the sequence returns to step S1 if the answer is negative. On the other hand, the procedure is terminated when the answer is affirmative.

According to the procedure described, the image management data is read from the optical disk and written to the flash member 7 when the flag in the memory 9 is "0", while if the flag in the memory 9 is "1", this operation is not performed, and the camera is ready for photographing and reproduction.

Figure 3:
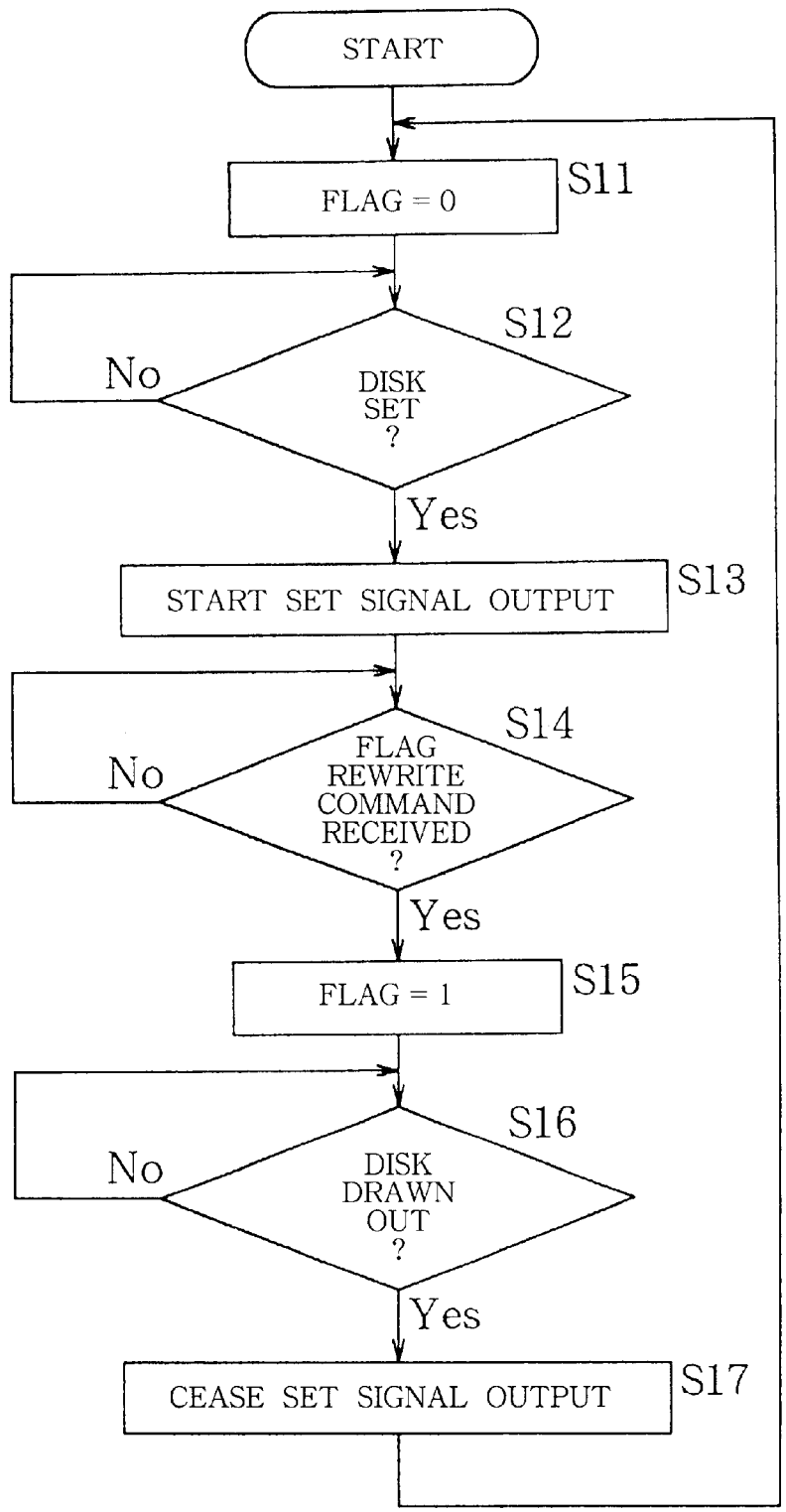
FIG. 3 is a flow chart showing the flag rewriting procedure to be performed by a microcomputer incorporated in a flag processing circuit of the invention.

FIG. 3 shows the flag rewriting procedure to be performed by the microcomputer incorporated in the flag processing circuit 8.

A flag with "0" is written to the memory 9 first in step S11, and an inquiry is then made in step S12 as to whether an optical disk is set in the disk drive device 1 with reference to the on-off state of the switch incorporated in the drive device 1. When the answer is negative, step S12 follows again to repeat the same inquiry.

On the other hand, when the inquiry of step S12 is answered in the affirmative, step S13 follows, starting to output a set signal to the control circuit 2. An inquiry is thereafter made in step S14 as to whether a flag rewrite command is given by the control circuit 2. If the answer is negative, step S14 follows again to repeat the same inquiry.

In the case where the flag rewrite command is given by the control circuit 2 in step S5 shown in FIG. 2, an affirmative answer is obtained in step S14 of FIG. 3, and the flag in the memory 9 is changed from "0" to "1" in step S15.

Subsequently in step S16, an inquiry is made as to whether the disk is drawn out of the drive device 1 with reference to the on-off state of the switch incorporated in the drive device 1. When the answer is negative, step S16 follows again to repeat the same inquiry.

When the inquiry of step S16 is answered in the affirmative with the disk removed from the drive device 1, step S17 follows to cease the set signal output to the control circuit 2, and the sequence returns to step S11.

According to the procedure described, the flag in the memory 9 is changed from "0" to "1" when the image management data recorded on the disk set in the drive device 1 is written to the flash member 7. The switch is thereafter checked for the withdrawal of the disk, and the flag is changed from "1" to "0" upon the disk being drawn out of the drive device.

With the digital camera thus embodying the invention, image management data is read and written to a memory upon the power source of the camera main body being turned on in the case where the disk has been replaced with the power source off, and image management data is read and written upon replacement of the disk while the power source is on.

With the digital camera of the present embodiment, the image management data is read and written when the power source of the camera main body is turned on only in the case where disk replacement is made while the power source is off. The camera is therefore smaller in power consumption than the convention digital camera wherein the image management data is read and written every time the power source of the camera main body is turned on.

What is claimed is:

1. A digital camera comprising an image pickup device and a disk drive device adapted to record on a disk images photographed by the image pickup device and image management data as to the images as digital data, or to reproduce images and image management data recorded on the disk, the digital camera being characterized in that the camera comprises:

memory means comprising a nonvolatile memory for storing the image management data recorded on the disk, information processing means for reading the image management data from the disk as placed in the disk drive device and writing the read image management data to the memory means when a power source of main body of the camera is turned on, means for storing therein a flag having a first value indicating a need to cause the information processing means to read and write the image management data or a second value indicating that there is no need to do so, said flag storing means being a separate component from other storing means of said camera, flag processing means for rewriting the flag in response to an action of a user, said flag processing means being a separate component from other processing means of said camera, and power supply means for holding the flag storing means and the flag processing means in operation at all times, the information processing means comprising:

means for checking whether the flag stored in the flag storing means has the first value or the second value when the camera body power source is turned on, and data processing means for reading the image management data from the disk as placed in the disk drive device and writing the read image management data to the memory means when the flag has the first value.

2. A digital camera according to claim 1 wherein the flag processing means comprises:

means for detecting withdrawal of the disk from the disk drive device, and flag rewrite means for changing the flag value to the second value in response to a flag rewrite command and changing the flag value to the first value when the disk is drawn out to the disk drive device, the information processing means comprising means for commanding the flag rewrite means to rewrite the flag when the image management data has been read and written by the data processing means.

3. A digital camera according to claim 1 wherein the information processing means comprises first updating means for updating the image management data on the disk in response to an action of the user, and second updating means for updating the image management data written to the memory means upon updating of the image management data on the disk.

* * * * *